United States Patent
Kato

(10) Patent No.: US 11,512,962 B2
(45) Date of Patent: Nov. 29, 2022

(54) OUTPUT DEVICE, CONTROL METHOD, PROGRAM AND STORAGE MEDIUM

(71) Applicant: PIONEER CORPORATION, Tokyo (JP)

(72) Inventor: Masahiro Kato, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 133 days.

(21) Appl. No.: 16/618,085

(22) PCT Filed: May 28, 2018

(86) PCT No.: PCT/JP2018/020358
§ 371 (c)(1),
(2) Date: Nov. 27, 2019

(87) PCT Pub. No.: WO2018/221453
PCT Pub. Date: Dec. 6, 2018

(65) Prior Publication Data
US 2020/0271454 A1    Aug. 27, 2020

(30) Foreign Application Priority Data

May 31, 2017    (JP) .............................. JP2017-108582

(51) Int. Cl.
*G01C 21/30* (2006.01)
*G01S 17/42* (2006.01)
*G05D 1/00* (2006.01)

(52) U.S. Cl.
CPC .............. *G01C 21/30* (2013.01); *G01S 17/42* (2013.01); *G05D 1/0088* (2013.01)

(58) Field of Classification Search
CPC ....... G01C 21/30; G01C 21/005; G01S 17/42; G05D 1/0088; G05D 1/0274; G09B 29/106; G08G 1/16
See application file for complete search history.

(56) References Cited

U.S. PATENT DOCUMENTS 9,062,979 B1 *  6/2015  Ferguson ............... G01C 21/26
2007/0198177 A1   8/2007  Yamada
(Continued)

FOREIGN PATENT DOCUMENTS

EP       1962162 A2     8/2008
JP      2007205948 A    8/2007
(Continued)

OTHER PUBLICATIONS

Mukoyama Yoshio, English translation of JP-2014048205, 2014 (Year: 2014).*
Nishira Hikari, English translation of JP-2014034251, 2014 (Year: 2014).*
(Continued)

*Primary Examiner* — Abby Y Lin
*Assistant Examiner* — Danielle Marie Jackson
(74) *Attorney, Agent, or Firm* — Procopio, Cory, Hargreaves & Savitch LLP

(57) ABSTRACT

An onboard device 1 acquires, from map DB 10 including voxel data, reliability information included in the voxel data corresponding to voxels around the route when determining that the accuracy of an estimated position has decreased. Then, on the basis of the acquired reliability information, the onboard device 1 sets a voxel suitable for estimating the own vehicle position as a reference voxel Btag. Then, the onboard device 1 output, to an electronic control device of the vehicle, control information for correcting the target track of the vehicle so as for the vehicle to pass the position suitable for measuring the reference voxel Btag.

11 Claims, 7 Drawing Sheets

(56) References Cited

U.S. PATENT DOCUMENTS

| | | | |
|---|---|---|---|
| 2008/0010009 A1 | 1/2008 | Miyoshi | |
| 2008/0208455 A1 | 8/2008 | Hartman | |
| 2010/0061591 A1* | 3/2010 | Okada | G01C 21/30 382/103 |
| 2013/0345968 A1 | 12/2013 | Hartman | |
| 2014/0309841 A1 | 10/2014 | Hara et al. | |
| 2016/0305794 A1 | 10/2016 | Horita et al. | |
| 2020/0003563 A1* | 1/2020 | Miyake | G01C 21/3407 |

FOREIGN PATENT DOCUMENTS

| | | |
|---|---|---|
| JP | 2008020225 A | 1/2008 |
| JP | 2014034251 A | 2/2014 |
| JP | 2014048205 A | 3/2014 |
| JP | 2015108604 A | 6/2015 |
| WO | 2013076829 A1 | 5/2013 |

OTHER PUBLICATIONS

Bruns, Christian J "Lidar-based Vehicle Localization in an Autonomous Valet Parking Scenario" 2016, Graduate Program in Electrical and Computer Engineering, The Ohio State University, pp. 10-11 (Year: 2016).*
Extended European Search Report dated Feb. 11, 2021, from corresponding EP Patent Application No. 18809569.9, 9 pages.
International Search Report for related International Application No. PCT/JP2018/020358, dated Aug. 21, 2018; English translation provided; 3 pages.

* cited by examiner

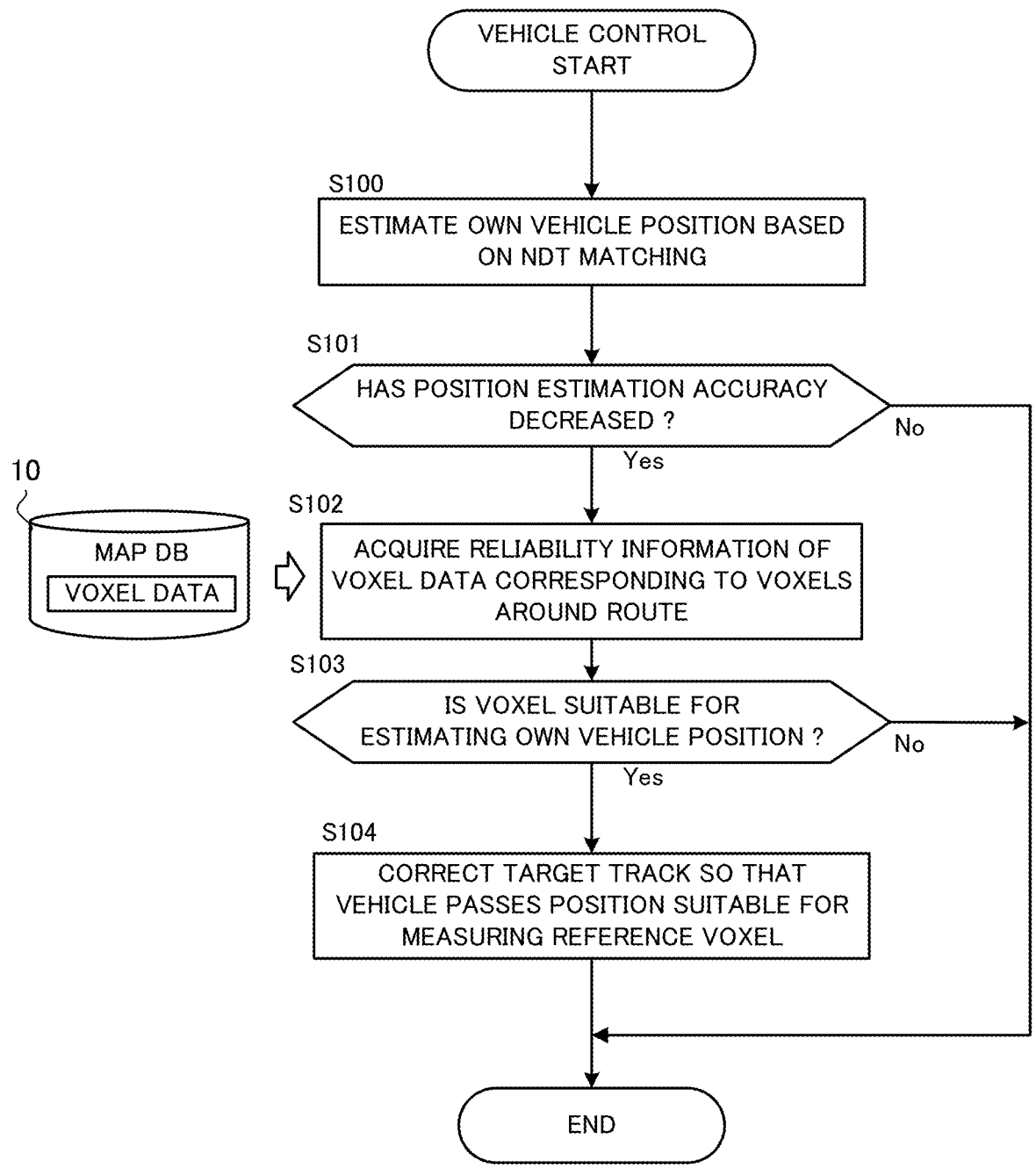

OUTPUT DEVICE, CONTROL METHOD, PROGRAM AND STORAGE MEDIUM

TECHNICAL FIELD

The present invention relates to a technique of controlling a vehicle.

BACKGROUND TECHNIQUE

There is known a method of estimating the own vehicle position by collating (matching) the shape data of a peripheral object measured by a measurement device such as a laser scanner with map information in which the shape of the peripheral object is recorded in advance. For example, Patent Reference 1 discloses an autonomous moving system which determines whether a detected object situated in voxels, into which space is regularly divided, is a stationary object or moving object and which performs matching between the measurement data and map data with respect to voxels where the stationary object is determined to exist.

PRIOR ART REFERENCES

Patent References

Patent Reference 1: International Publication WO2013/076829

SUMMARY OF THE INVENTION

Problem to be Solved by the Invention

The accuracy of the position information regarding stationary structures recorded in map information has a variety. If matching is performed with reference to a stationary object corresponding to the position information with a low degree of accuracy recorded in the map information, the accuracy of the matching by use of the map information decreases, which leads to the decrease of the accuracy of the estimated own position. Patent Reference 1 is silent on such an issue.

The above is an example of issues to be solved by the present invention. It is an object of the present invention to provide an output device suitable for increasing the accuracy of an estimated position.

Means for Solving the Problem

An invention described in claims is an output device including: an acquisition unit configured to acquire accuracy information regarding position information of an object, the accuracy information being attached to map information in which the position information is recorded; an output unit configured to output, on a basis of the accuracy information acquired by the acquisition unit, control information for controlling a moving body.

Another invention described in claims is an output device including: an acquisition unit configured to acquire weight information regarding possibility of an occlusion, the weight information being attached to map information in which position information of an object is recorded; and an output unit configured to output, on a basis of the weight information acquired by the acquisition unit, control information for controlling a moving body.

Still another invention described in claims is a control method executed by an output device including: an acquisition process to acquire accuracy information regarding position information of an object, the accuracy information being attached to map information in which the position information is recorded; an output process to output, on a basis of the accuracy information acquired in the acquisition process, control information for controlling a moving body.

Still another invention described in claims is a program executed by a computer, the program causing the computer to function as: an acquisition unit configured to acquire accuracy information regarding position information of an object, the accuracy information being attached to map information in which the position information is recorded; an output unit configured to output, on a basis of the accuracy information acquired by the acquisition unit, control information for controlling a moving body.

BRIEF DESCRIPTION OF THE DRAWINGS

FIG. 7 is a flowchart indicative of the procedure executed by the onboard device.

DETAILED DESCRIPTION OF THE PREFERRED EMBODIMENTS

Figure 1:
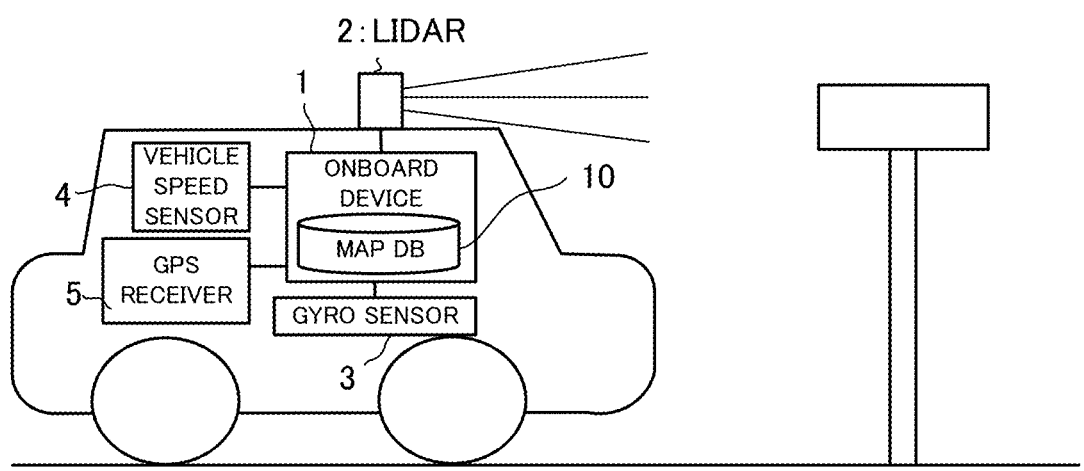
FIG. 1 is a diagram illustrating a schematic configuration of a driving support system.

According to a preferable embodiment of the present invention, there is provided an output device including: an acquisition unit configured to acquire accuracy information regarding position information of an object, the accuracy information being attached to map information in which the position information is recorded; an output unit configured to output, on a basis of the accuracy information acquired by the acquisition unit, control information for controlling a moving body. According to this mode, the output device can suitably control the moving body based on the accuracy information which is attached to the map information.

In one mode of the above output device, the output device further includes a position estimation unit configured to estimate a position of the moving body by matching an output of a measurement unit to the position information included in the map information, the measurement unit measuring a position of an object situated in surroundings of the moving body. According to this mode, on the basis of the accuracy information attached in the map information, the output device moves the moving body to such a position that the matching between the output of the measurement unit and the position information of the map information can be performed accurately. Thereby, it is possible to suitably increase the accuracy of the estimated position.

In another mode of the above output device, the map information includes position information with respect to each of regions into which space is regularly divided, and wherein the position estimation unit weights, on a basis of the accuracy information, an evaluation value which evaluates a degree of matching with respect to each of the regions. According to this mode, the output device can suitably increase the accuracy of the estimated position by increasing the weight on voxel(s) which include position information with a high degree of reliability.

In still another mode of the above output device, the map information includes position information with respect to each of regions into which space is regularly divided, and wherein the output unit outputs the control information for moving the moving body to a position at which a region determined based on the accuracy information is measured by the measurement unit. According to this mode, the output device can suitably control the moving body so as to measure the region determined based on the accuracy information.

In still another mode of the above output device, the output unit outputs the control information for moving the moving body onto a lane nearest to the region determined by the accuracy information or moving the moving body to approach the region determined by the accuracy information within a lane where the moving body is travelling. According to this mode, the output device can control the moving body so as to surely and accurately measure the region determined based on the accuracy information.

In a preferable example of the above output device, the accuracy information may be determined based on a distance from a measurement vehicle to a target object of measurement and an accuracy of position estimation by the measurement vehicle, the measurement vehicle performing a measurement for generating the position information.

In still another mode of the above output device, weight information regarding possibility of an occlusion is attached to the map information, and wherein the output unit outputs, on a basis of the accuracy information and the weight information, the control information for controlling the moving body. According to this mode, the output device can output the control information for controlling the moving body considering both of the accuracy information and the weight information regarding the occlusion.

In still another mode of the above output device, the output device further includes a position estimation unit configured to estimate a position of the moving body by matching an output outputted by a measurement unit to the position information included in the map information, the measurement unit measuring a position of an object situated in surroundings of the moving body, wherein the map information includes position information with respect to each of regions into which space is regularly divided, and wherein the position estimation unit weights, on a basis of the accuracy information and the weight information, an evaluation value which evaluates a degree of matching with respect to each of the regions. According to this mode, the output device can suitably increase the accuracy of the estimated position by increasing the weight on such a voxel that has position information with a high degree of reliability determined in terms of the occlusion and the accuracy.

In a preferable example of the above output device, the weight information may be determined based on a height indicated by the position information.

According to another preferable embodiment of the present invention, there is provided an output device including: an acquisition unit configured to acquire weight information regarding possibility of an occlusion, the weight information being attached to map information in which position information of an object is recorded; and an output unit configured to output, on a basis of the weight information acquired by the acquisition unit, control information for controlling a moving body. According to this mode, the output device can suitably control the moving body based on the weight information that is attached to the map information.

According to still another preferable embodiment of the present invention, there is provided a control method executed by an output device including: an acquisition process to acquire accuracy information regarding position information of an object, the accuracy information being attached to map information in which the position information is recorded; an output process to output, on a basis of the accuracy information acquired in the acquisition process, control information for controlling a moving body. By executing the control method, the output device can suitably control the moving body based on the accuracy information that is attached to the map information.

According to still another preferable embodiment of the present invention, there is provided a program executed by a computer, the program causing the computer to function as: an acquisition unit configured to acquire accuracy information regarding position information of an object, the accuracy information being attached to map information in which the position information is recorded; an output unit configured to output, on a basis of the accuracy information acquired by the acquisition unit, control information for controlling a moving body. By executing the above program, the computer can suitably control the moving body based on the accuracy information that is attached to the map information. In some embodiments, a storage medium stores the above program.

Embodiments

A preferred embodiment of the present invention will be described below with reference to the attached drawings.

FIG. 1 is a schematic configuration diagram of a driving support system according to the embodiments. The driving support system illustrated in FIG. 1 roughly includes an onboard device 1 loaded on a vehicle and performing a control on the driving support of the vehicle, a lidar (Light Detection and Ranging or Laser Illuminated Detection and Ranging) 2, a gyro sensor 3, a vehicle speed sensor 4 and a GPS receiver 5.

The onboard device 1 is electrically connected with the lidar 2, the gyro sensor 3, the vehicle speed sensor 4 and the GPS receiver 5, and estimates the position of the vehicle (referred to as "own vehicle position") on which the onboard device 1 is loaded based on the outputs of those elements. Then, on the basis of the estimation result of the own vehicle position, the onboard device 1 performs autonomous driving control of the vehicle to guide the vehicle along the route to the set destination. The onboard device 1 includes a map DB (DB: Database) 10 which includes voxel data. The voxel data is data in which the position information of stationary object(s) (stationary structure(s)) with respect to each voxel is recorded, wherein each voxel is a three-dimensional region into which space is regularly divided. The voxel data includes data which indicates, in a form of normal distribution, point cloud data of measured stationary object (s) situated in each voxel. As described below, the voxel data is used for a scan matching (collation) by use of NDT (Normal Distributions Transform).

The lidar 2 emits pulse lasers within a predetermined angle range in a horizontal direction and a vertical direction to discretely measure the distance to an object existing in an external field and generates three-dimensional point cloud information indicating the position of the object. In this case, the lidar 2 includes an radiation unit which radiates the laser light while changing the radiation direction, a light receiving unit which receives the reflected light (scattering light) of the radiated laser light, and an output unit which outputs scan data based on the light receiving signal outputted by the light receiving unit. The scan data is generated based on the radiation direction corresponding to the laser light received by the light receiving unit and the response delay time of the laser light specified based on the light receiving signal. Generally, the shorter the distance to the target object is, the higher the accuracy of the distance measurement value outputted by the lidar becomes, whereas the longer the distance to the target object the lower the above accuracy becomes. The lidar 2, the gyro sensor 3, the vehicle speed sensor 4 and the GPS receiver 5 supply the output data to the onboard device 1, respectively. The onboard device 1 is an example of the "output device" according to the present invention and the lidar 2 is an example of the "measurement unit" according to the present invention.

Figure 2:
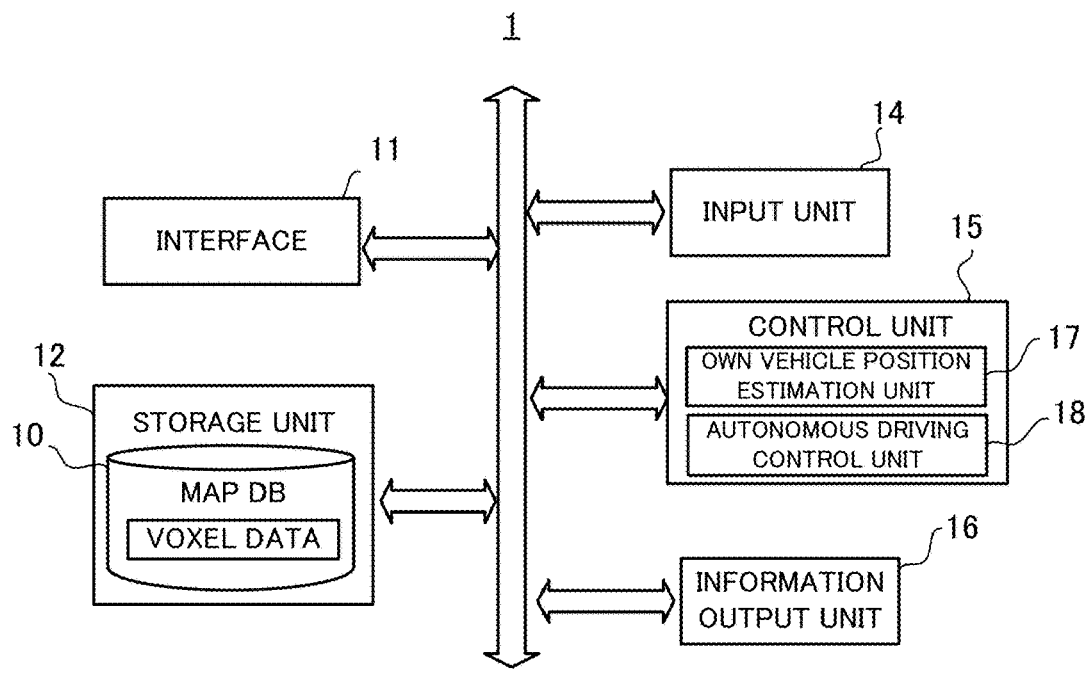
FIG. 2 is a block diagram illustrating a functional configuration of an onboard device.

FIG. 2 is a block diagram illustrating a functional configuration of the onboard device 1. The onboard device 1 mainly includes an interface 11, a storage (memory) unit 12, an input unit 14, a control unit 15 and an information output unit 16. These elements are connected with each other by a bus line.

The interface 11 acquires the output data from the sensors such as the lidar 2, the gyro sensor 3, the vehicle speed sensor 4 and the GPS receiver 5, and supplies them to the control unit 15. Also, the interface 11 supplies the signals associated with the driving control of the vehicle, which is generated by the control unit 15, to an ECU (Electronic Control Unit) of the vehicle. A signal which the control unit 15 sends through the interface 11 to the ECU (electronic control device) of the vehicle is an example of the "control information" according to the present invention.

The storage unit 12 stores programs executed by the control unit and information necessary for the control unit 15 to execute predetermined processing. In the embodiments, the storage unit 12 stores the map DB 10 including voxel data. It is noted that the map DB 10 may be regularly updated. In this case, for example, through a communication unit not shown, the control unit 15 receives partial map information regarding the area to which the own vehicle position belongs from a server device which manages map information and control unit 15 updates the map DB 10 by using it.

The input unit 14 may be buttons, a touch panel, a remote controller or a voice input device to be operated by a user, and receives an input to designate a destination for the route search or an input designating ON or OFF of the autonomous driving. The information output unit 16 may be a display or a speaker for outputting information based on the control by the control unit 15.

The control unit 15 includes a CPU for executing programs and controls the entire onboard device 1. In the embodiments, the control unit 15 includes an own vehicle position estimation unit 17, and an autonomous driving control unit 18. The control unit 15 is an example of the "acquisition unit", "position estimation unit", "output unit" and "computer" which executes a program according to the present invention.

The own vehicle position estimation unit 17 estimates the own vehicle position by performing the scan matching based on NDT on the basis of the point cloud data outputted by the lidar 2 and the voxel data corresponding to voxels where the point cloud data belongs.

The autonomous driving control unit 18 refers to the map DB 10 and transmits signals necessary for the autonomous driving control to the vehicle based on the set route and the own vehicle position estimated by the own vehicle position estimation unit 17. The autonomous driving control unit 18 sets a target track based on the set route, and controls the position of the vehicle by transmitting the guide signal to the vehicle such that the own vehicle position estimated by the own vehicle position estimation unit 17 stays within a deviation width smaller than a predetermined width from the target track. Additionally, according to this embodiment, at the time of determining that the estimation accuracy of the own vehicle position by the own vehicle position estimation unit 17 decreases, the autonomous driving control unit 18 selects a voxel suitable for estimating the own vehicle position by referring to the voxel data. In this case, the autonomous driving control unit 18 considers the selected voxel as a voxel (referred to as "reference voxel stag") subjected to a reference in estimating the own vehicle position. Then, the autonomous driving control unit 18 corrects the target track of the vehicle so that the vehicle moves on to a position suitable for detecting the reference voxel Btag by the lidar 2.

[Data Structure of Voxel Data]

Figure 3:
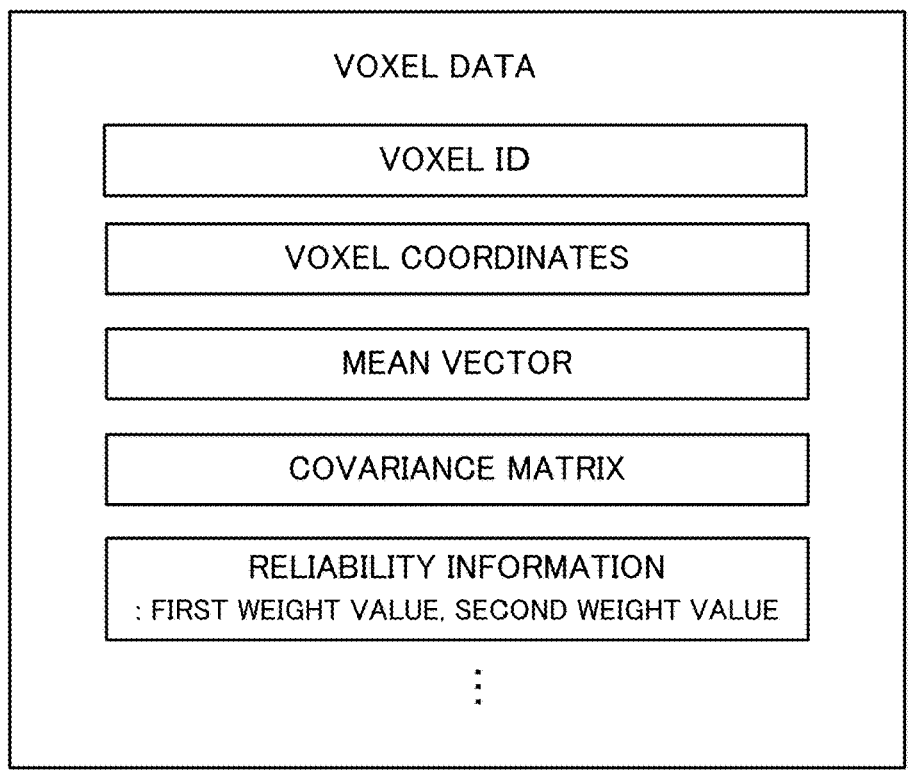
FIG. 3 schematically illustrates an example of the data structure of voxel data.

A description will be given of the voxel data to be used for the scan matching based on NDT. FIG. 3 schematically illustrates an example of the data structure of the voxel data.

The voxel data includes information relating to parameters of a normal distribution for expressing the point cloud in each voxel. According to the embodiment, as illustrated in FIG. 3, the voxel data includes the voxel ID, the voxel coordinates, the mean vector, the covariance matrix and the reliability information. The "voxel coordinates" herein indicates three-dimensional absolute coordinates of the reference position (such as central position) of each voxel. It is noted that each voxel is a cube or grid into which space is divided in a reticular pattern and the shape and the size thereof is preliminarily determined. Thus, it is possible to identify a region of a voxel by its voxel coordinates. It is also noted that the voxel coordinates may be used as a voxel ID.

The "mean vector" and "covariance matrix" indicate the mean vector and the covariance matrix corresponding to parameters of the normal distribution which stands for the point cloud in a target voxel, respectively. Here, the coordinates of a point "i" in a voxel "k" is defined as follows.

$$X_k(i) = \begin{bmatrix} x_k(i) \\ y_k(i) \\ z_k(i) \end{bmatrix}$$

Furthermore, the number of points included in the point cloud in the voxel k is also defined as "$N_k$". Then, the mean vector "$\mu_k$" and the covariance matrix "$V_k$" are expressed as the following equation (1) and the equation (2), respectively.

$$\mu_k = \begin{bmatrix} \bar{x}_k \\ \bar{y}_k \\ \bar{z}_k \end{bmatrix} = \frac{1}{N_k} \sum_{i=1}^{N_k} X_k(i) \qquad (1)$$

$$V_k = \frac{1}{N_k - 1} \sum_{i=1}^{N_k} \{X_k(i) - \mu_k\}\{X_k(i) - \mu_k\}^T \qquad (2)$$

It is noted that each of the mean vector and covariance matrix included in the voxel data is an example of the "position information of an object".

The "reliability information" includes a first weight value and a second weight value, wherein the first weight value is a weight value based on the possibility of the occlusion (shielding by obstacle(s)) of the target voxel and the second weight value is a weight value based on the accuracy (correctness) of the voxel data (especially, the mean vector and covariance matrix) of the target voxel. In the embodiment, it is assumed that the smaller the probability of the occlusion of a voxel is, the larger the first weight value corresponding to the voxel becomes. The first weight value is an example of the "weight information" according to the present invention.

For example, the second weight value is determined based on: the accuracy of estimating the own vehicle position by a map maintenance vehicle which collects measurement data to be used for generating the voxel data; and the accuracy of the measurement by the measurement device (e.g., lidar) which output the above measurement data. For example, it firstly calculates, as a target accuracy, the square-root of sum of squares of the accuracy of the estimated own vehicle position of the map maintenance vehicle and the accuracy of the measurement by the measurement device, and then calculates the inverse of the square of above target accuracy as the second weight value. According to the embodiment, the higher the accuracy of the estimated own vehicle position of the map maintenance vehicle in collecting the measurement data is, the larger the second weight value becomes. Furthermore, the higher the accuracy of the measurement by the measurement device which outputs the measurement data is, the larger the second weight value becomes. In a case where the measurement device is a lidar, the above accuracy of the measurement increases with decreasing distance from the measurement position to an object subjected to measurement. Accordingly, for example, the second weight value is determined on the basis of: the distance between the position indicated by the voxel coordinates of the target voxel and the own vehicle position of the map maintenance vehicle estimated at the time of travelling; and the accuracy of the estimated own vehicle position of the map maintenance vehicle. For an own vehicle position estimation such as RTK-GPS, it is possible to acquire not only information associated with the estimated own vehicle position but also information associated with the accuracy of the estimated own vehicle position. The second weight value is an example of the "accuracy information" according to the present invention.

A description will be given of examples of determining the first weight value and the second weight value.

Figure 4:
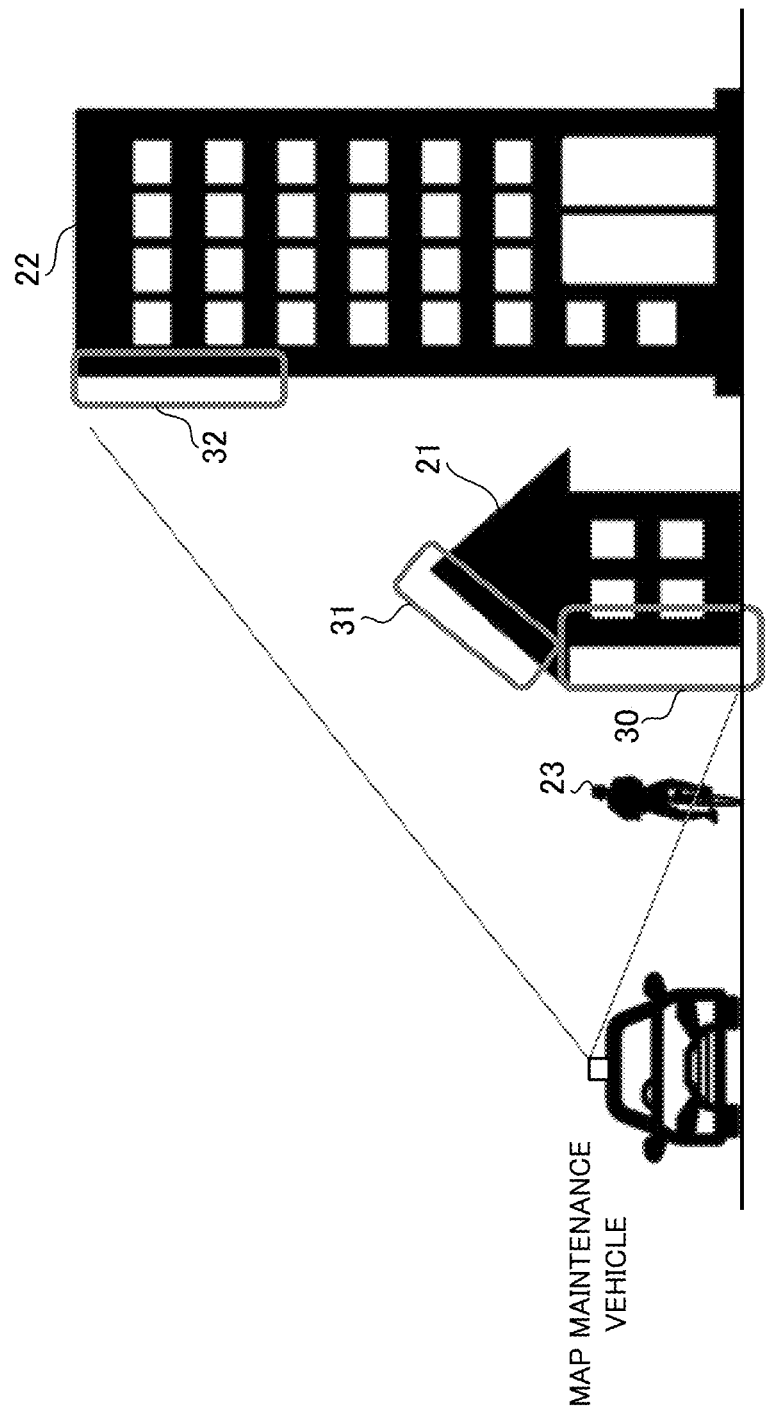
FIG. 4 illustrates an example of a positional relation between a map maintenance vehicle equipped with a lidar and objects situated within the range of measurement by the map maintenance vehicle.

FIG. 4 illustrates an example of a positional relation between the map maintenance vehicle equipped with a lidar and objects situated within the range of measurement by the map maintenance vehicle. According to the example in FIG. 4, there is a low-rise construction 21 that is a feature (stationary object) in the vicinity of the road where the vehicle travels and there is also a high-rise construction 22 behind the low-rise construction 21. Additionally, there is a person 23 who is riding on a bicycle in front of the low-rise construction 21. In this case, the map maintenance vehicle acquires, through a measurement device such as a lidar, the measurement data indicative of the positions in the frames 30 to 32.

In this case, a portion of the low-rise construction 21 surrounded by the frame 30 is located at a relatively low position at which an occlusion by a moving body such as the person 23 is likely to occur. Thus, a relatively low value is set to the first weight value corresponding to the voxel data which overlaps with the frame 30. In contrast, a portion of the low-rise construction 21 surrounded by the frame 30 is located relatively near the maintenance vehicle. Thus, the accuracy of the measurement data thereof acquired by the measurement device is expected to be high. Accordingly, a relatively high value indicative of a high degree of accuracy is set to the second weight value corresponding to the voxel data at the position which overlaps with the frame 30. A portion of the low-rise construction 21 surrounded by the frame 31 is located at such a position a little higher than the map maintenance vehicle. However, at the portion, there remains a possibility of occurrence of an occlusion by a tall vehicle such as a truck. Besides, the portion in the frame 31 is located at a position a little far from the map maintenance vehicle and therefore the accuracy of the measurement data of the portion in the frame 31 acquired by the measurement device is a little lower than the accuracy of the measurement data of the portion in the frame 30. Thus, an intermediate value is set to the first weight value corresponding to the voxel data at the position which overlaps with the frame 31 and an intermediate value is also set to the second weight value corresponding thereto.

In contrast, a portion of the high-rise construction 22 surrounded by the frame 32 is located at a relatively high position at which an occlusion by a moving body such as the person 23 and other vehicles is not likely to occur. Thus, a relatively high value is set to the first weight value corresponding to the voxel data at the position which overlaps with the frame 32. Besides, the portion in the frame 32 is located at a position a little far from the map maintenance vehicle and therefore the accuracy of the measurement data of the portion in the frame 32 acquired by the measurement device such as a lidar is expected to be low. Thus, a relatively low value indicative of a low degree of accuracy is set to the second weight value corresponding to the voxel data at the position which overlaps with the frame 32.

In this way, in some embodiments, the first weight value increases with increasing height of the target voxel above the surface of the ground and the second weight value increases with decreasing distance between the target voxel and the map maintenance vehicle at the time of measurement thereof.

[Overview of Scan Matching]

Next, a description will be given of the NDT scan matching by use of the voxel data. According to this embodiment, as described later, the onboard device 1 calculates the value (evaluation value) of an evaluation function obtained through the NDT scan matching through weighting by use of reliability information included in the voxel data. Thereby, the onboard device 1 suitably increases the accuracy of the position estimation based on the NDT scan matching.

For an NDT scan matching applied to the vehicle position estimation, the following estimation parameters "P" whose elements are amount of movement on the road plane (an x-y plane) and direction of the vehicle are to be estimated.

$$P = \begin{bmatrix} t_x \\ t_y \\ \psi \end{bmatrix}$$

Herein, the sign "$t_x$" indicates the amount of movement in the x direction and the sign "$t_y$" indicates the amount of movement in the y direction and the sign "$\psi$" indicates rotational angle (i.e., yaw angle) on the x-y plane. It is noted that the amount of movement in the vertical direction, the pitch angle and the roll angle is vanishingly small though they are generated due to the road gradient and the vibration.

When a coordinate transformation by use of the above estimation parameters P is applied to the coordinates $[x_k(i), y_k(i) \, z_k(i)]^T$ of a point indicated by the point cloud data acquired by the lidar 2, the coordinates "$X'_k(i)$" after the coordinate transformation is expressed as the following equation (3).

$$X'_k(i) = \begin{bmatrix} x'_k(i) \\ y'_k(i) \\ z'_k(i) \end{bmatrix} = \begin{bmatrix} \cos\psi & \sin\psi & 0 \\ -\sin\psi & \cos\psi & 0 \\ 0 & 0 & 1 \end{bmatrix} \begin{bmatrix} x_k(i) \\ y_k(i) \\ z_k(i) \end{bmatrix} + \begin{bmatrix} t_x \\ t_y \\ 0 \end{bmatrix} \quad (3)$$

Then, according to the embodiment, by using the point cloud after the coordinate transformation in addition to the mean vector $\mu_k$ and the covariance matrix $V_k$ which are included in the voxel data, the onboard device 1 calculates the evaluation function "$E_k$" of the voxel k according to the following equation (4) and the total evaluation function "E" with respect to all voxels subjected to matching according to the following equation (5).

$$E_k = \frac{w_k}{\sum_{k=1}^{M} w_k} \cdot \frac{\frac{1}{\sigma_k^2}}{\sum_{k=1}^{M} \frac{1}{\sigma_k^2}} \cdot \frac{1}{N_k} \sum_{i=1}^{N_k} \exp\left\{-\frac{1}{2}(X'_k(i) - \mu_k)^T V_k^{-1}(X'_k(i) - \mu_k)\right\} \quad (4)$$

$$E = \sum_{k=1}^{M} E_k = E_1 + E_2 + \cdots + E_M \quad (5)$$

The sign "M" indicates the number of the voxels subjected to matching and the sign "$w_k$" indicates the first weight value corresponding to the voxel k. The sign "$\sigma_k$" indicates the accuracy information regarding the voxel k and "$1/\sigma_k^2$" indicates the second weight value corresponding to the voxel k. The second weight value $1/\sigma_k^2$ increases with increasing degree of accuracy (i.e., reliability). Thus, according to the equation (4), the evaluation function $E_k$ increases with the increasing first weight value $w_k$ and with the increasing second weight value $1/\sigma_k^2$. Additionally, since the equation (4) is normalized by the point cloud number $N_k$, the influence depending on the number of points of the point cloud in each voxel is reduced. It is noted that the coordinates of the point cloud data acquired by the lidar 2 is relative coordinates relative to the own vehicle position whereas the mean vector indicated by the voxel data is the absolute coordinates. Thus, at the time of calculation of the equation (4), for example, the coordinate transformation based on the own vehicle position according to the output of the GPS receiver 5 is applied to the coordinates of the point cloud data acquired by the lidar 2.

In contrast, the evaluation function $E_k$ of the voxel k used in the conventional NDT matching is expressed by the following equation (6).

$$E_k = \sum_{i=1}^{N_k} \exp\left\{-\frac{1}{2}(X'_k(i) - \mu_k)^T V_k^{-1}(X'_k(i) - \mu_k)\right\} \quad (6)$$

As is obvious from the comparison between the equation (4) and the equation (6), by using the first weight value $w_k$ and the second weight value $1/\sigma_k^2$, the onboard device 1 according to the embodiment weights each voxel depending on the degree of reliability of its voxel data (mean vector and covariance matrix). Thereby, the onboard device 1 puts a small weight on the evaluation function $E_k$ of the voxel with a low degree of reliability and suitably increases the accuracy of the estimated position based on the NDT matching.

Thereafter, the onboard device 1 calculates such estimation parameters P that maximize the total evaluation function E by using any root-finding algorithm such as the Newton method. Then, the onboard device 1 estimates the own vehicle position with a high degree of accuracy by applying the estimation parameters P to the own vehicle position specified according to the output of the GPS receiver 5 and the like.

Next, a description will be given on specific examples of the NDT scan matching. Hereinafter, for the sake of explanations, cases that the NDT scan matching is applied on the two-dimensional coordinates are explained.

Figure 5A:
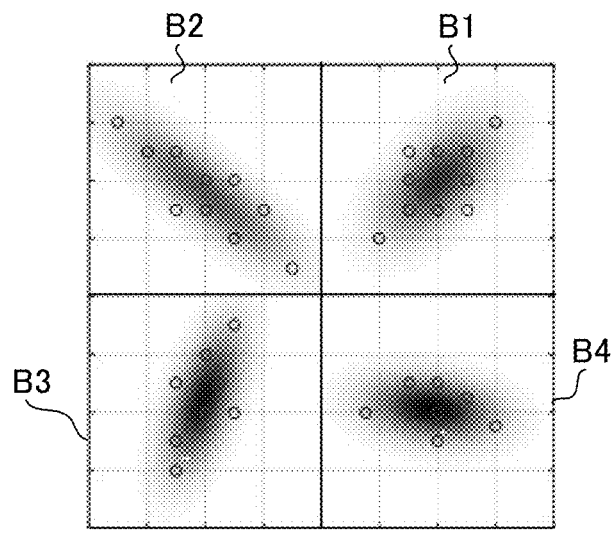
FIGS. 5A to 5C illustrate specific examples of an NDT scan matching.

FIG. 5A illustrates four voxels "B1" to "B4" adjacent to each other, wherein point cloud measured by lidar and the like mounted on a map maintenance vehicle are indicated by circles and two-dimensional normal distribution specified by parameters derived from the equation (1) and the equation (2) by use of the above point cloud is expressed by gradation. The mean and the variance of the normal distribution illustrated in FIG. 5A correspond to the mean vector and the covariance matrix of the voxel data, respectively.

Figure 5B:
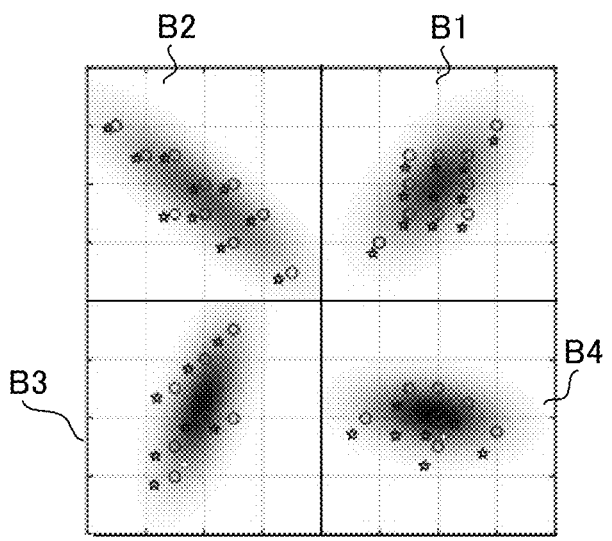

FIG. 5B illustrates, over the voxels illustrated in FIG. 5A, point cloud by stars which the onboard device 1 acquires by the lidar 2 at the time of travelling. The positions of the point cloud expressed by stars (acquired by the lidar 2) are adjusted to match the positions of voxels B1 to B4 on the basis of the own vehicle position estimated by use of the output of the GPS receiver 5. According to FIG. 5B, there are differences between the point cloud (indicated by circles) measured by the map maintenance vehicle and the point cloud (indicated by stars) acquired by the onboard device 1.

Figure 5C:
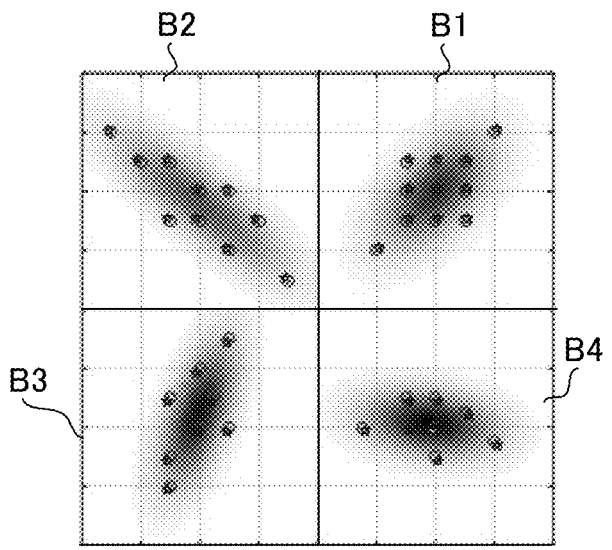

FIG. 5C illustrates the state of the voxels after the positions of the point cloud (indicated by stars) acquired by the onboard device 1 are shifted on the basis of the matching result of the NDT scan matching. In case of FIG. 5C, the parameters P which maximize the total evaluation function E indicated by the equation (5) is firstly calculated on the basis of the mean and the variance of the normal distribution illustrated in FIGS. 5A and 5B and then the parameters P are applied to the point cloud expressed by stars illustrated in FIG. 5B. In this case, the differences between the point cloud (indicated by circles) measured by the map maintenance vehicle and the point cloud (indicated by stars) acquired by the onboard device 1 are suitably reduced.

In cases that the evaluation functions "E1" to "E4" corresponding to the voxel B1 to B4 are calculated according to the conventionally-used general equation (6), the calculated values E1 to E4 are as follows.

E1=1.3290
E2=1.1365
E3=1.1100
E4=0.9686
E=4.5441

In this example, though there are no large differences among the evaluation functions E1 to E4 of each voxel, there are certain amount of differences due to the variation of the number of points of the point cloud in each voxel.

According to the embodiment, the first weight value and the second weight value are set to each voxel. Thus, by increasing the weight on a target voxel with increasing degree of reliability of the target voxel, it is possible to increase the degree of the matching regarding voxels with a high degree of reliability. Hereinafter, as a specific example, a description will be given, with reference to FIGS. 6A to 6C, of determination approaches of the first weight value on each of the voxels.

Figure 6A:
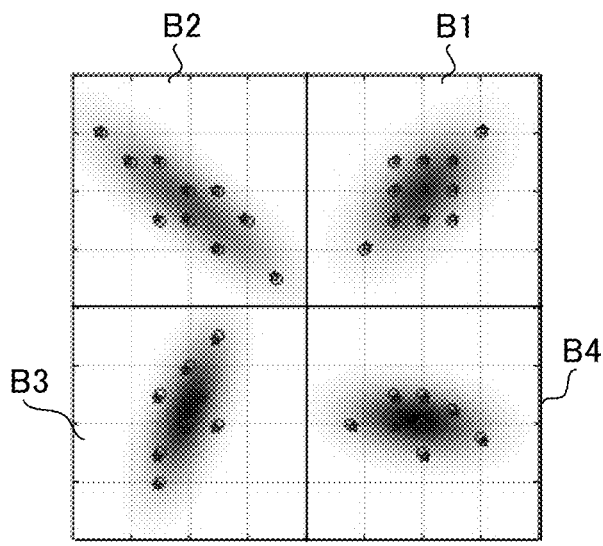
FIGS. 6A to 6C illustrate specific examples of the NDT scan matching by use of each weight value with respect to each voxel.
Figure 6B:
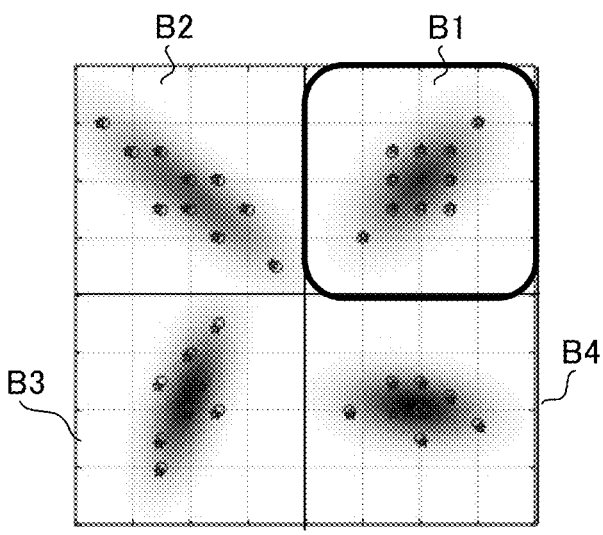
Figure 6C:
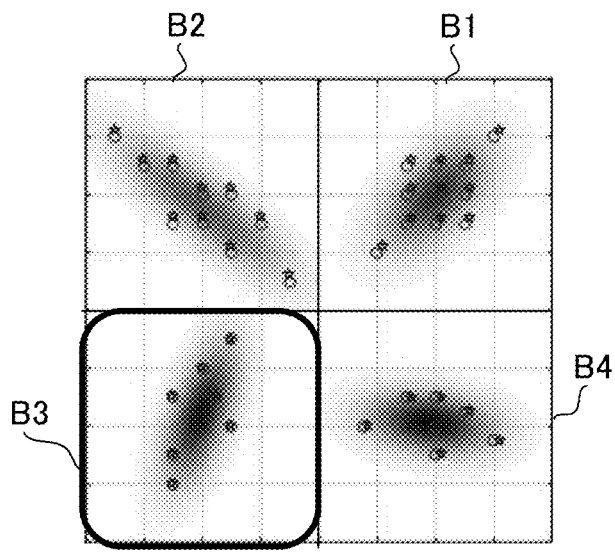

FIG. 6A illustrates the matching result in cases where the first weight values corresponding to the voxels B1 to B4 are set to be equal, i.e., FIG. 6A is identical to FIG. 5C. FIG. 6B illustrates the matching result in cases where the first weight value of the voxel B1 is ten times as large as the first weight values of the other voxels. FIG. 6C illustrates the matching result in cases where the first weight value of the voxel B3 is ten times as large as the first weight values of the other voxels. For either cases, the second weight values are set to be equal.

Regarding the example illustrated in FIG. 6B, the evaluation functions E1 to E4 corresponding to voxels B1 to B4 and the total evaluation function E are as follows.

E1=0.3720
E2=0.0350
E3=0.0379
E4=0.0373
E=0.4823

As seen from the above values, regarding the example illustrated in FIG. 6B, the matching is performed so that the value of the evaluation function E1 corresponding to the voxel B1 becomes high and therefore the degree of the matching on the voxel B1 is increased. As a result, the difference between the circles and the stars in the voxels B1 becomes small. Though the above values of the evaluation functions become small because of the normalization by use of the number of points of the point cloud, each value of the evaluation functions is almost proportional to its first weight value.

Regarding the example illustrated in FIG. 6C, the evaluation functions E1 to E4 corresponding to voxels B1 to B4 and the total evaluation function E are as follows.

E1=0.0368
E2=0.0341
E3=0.3822
E4=0.0365
E=0.4896

As seen from the above values, regarding the example illustrated in FIG. 6C, the matching is performed so that the value of the evaluation function E3 corresponding to the voxel B3 becomes high and therefore the degree of the matching on the voxel B3 is increased. As a result, the difference between the circles and the stars in the voxels B3 becomes small. In this way, by suitably determining the first weight value, it is possible to suitably increase the degree of the matching on such a voxel with little probability of occurrence of occlusion. In other words, it is possible to suitably reduce the degree of the matching on such a voxel with a high probability of occurrence of occlusion. It is also true for the second weight value. By suitably determining the second weight value, it is possible to suitably increase the degree of the matching on such a voxel with a relatively high degree of measurement accuracy while decreasing the degree of the matching on such as voxel with a relatively low degree of measurement accuracy.

[Vehicle Control Based on Reference Voxel]

FIG. 7 is a flowchart indicative of the procedure of the vehicle control based on the reference voxel Btag. The control unit 15 repeatedly executes the process of the flowchart in FIG. 7.

First, the own vehicle position estimation unit 17 estimates the own vehicle position based on the NDT matching (step S100). In this case, the own vehicle position estimation unit 17 acquires the vehicle speed from the vehicle speed sensor 4 and the angular speed in the yaw direction from the gyro sensor 3. Then, on the basis of the result of the acquisition, the own vehicle position estimation unit 17 calculates the distance of movement of the vehicle and the variation of the orientation of the vehicle. Thereafter, the own vehicle position estimation unit 17 calculates a predicted position by adding the calculated distance of movement and the variation of the orientation to the estimated own vehicle position (the initial value is, for example, output value of the GPS receiver 5) estimated at the preceding process time. Then, on the basis of the predicted position calculated above, the own vehicle position estimation unit 17 acquires from the map DB 10 the voxel data corresponding to voxels in surroundings of the own vehicle position. Furthermore, on the basis of the predicted position, the own vehicle position estimation unit 17 divides (classifies) the scan data acquired from the lidar 2 per voxel where each point of the scan data belongs and computes the NDT scan matching by use of the evaluation functions. In this case, according to the equations (4) and (5), the own vehicle position estimation unit 17 calculates the evaluation functions $E_k$ and the total evaluation function E and thereby calculates the estimation parameters P which maximize the total evaluation function E. Then, the own vehicle position estimation unit 17 calculates the estimated own vehicle position at the current time by applying the estimation parameters P to the predicted position mentioned before.

Next, the autonomous driving control unit 18 determines whether or not the accuracy of the estimated position has decreased (step S101). For example, in cases where the total evaluation function E corresponding to the estimation parameters P calculated at step S100 is smaller than a predetermined threshold, the autonomous driving control unit 18 determines that the accuracy of the estimated position has decreased. When the autonomous driving control unit 18 determines that the accuracy of the estimated position has decreased (step S101; Yes), the autonomous driving control unit 18 moves on to the process at step S102. In contrast, when the autonomous driving control unit 18 determines that the accuracy of the estimated position has not decreased (step S101; No), the autonomous driving control unit 18 terminates the process of the flowchart.

At step S102, with reference to the map DB 10, the autonomous driving control unit 18 acquires reliability information included in the voxel data corresponding to voxels around the route (step S102). In this case, for example, the autonomous driving control unit 18 acquires the reliability information from the voxel data recorded in the map DB 10 which corresponds to such voxels that are situated within a predetermined distance from the estimated own vehicle position and within a predetermined distance from the road on the route in the direction of the width of the road.

Then, on the basis of the reliable information acquired at step S102, the autonomous driving control unit 18 determines whether or not there is any voxel suitable for estimating the own vehicle position (step S103). For example, the autonomous driving control unit 18 determines whether or not there is any voxel whose voxel data includes such reliability information that the first weight value is larger than a predetermined value and the second weight value is larger than a predetermined value. In another example, the autonomous driving control unit 18 determines an index value of the reliability based on an equation, table or the like by use of the first weight value and the second weight value as parameters, and then determines whether or not there is a voxel corresponding to the voxel data whose index value of the reliability based on its reliability information is larger than a predetermined value.

When the autonomous driving control unit 18 determines that there is any voxel suitable for estimating the own vehicle position (step S103; Yes), the autonomous driving control unit 18 considers the voxel suitable for estimating the own vehicle position as the reference voxel Btag. Then, the autonomous driving control unit 18 corrects the target track of the vehicle so as to pass the position suitable for measuring the reference voxel Stag (step S104). In this case, for example, the autonomous driving control unit 18 corrects the target track so that the vehicle passes the nearest position to the reference voxel Btag among positions at which the reference voxel Stag can be measured by the lidar 2 and at which an occlusion regarding the reference voxel Btag does not occur. In this way, the autonomous driving control unit 18 lets the vehicle approach the reference voxel Btag within the measurable range of the reference voxel Btag, thereby suitably increasing the detection accuracy of the reference voxel Btag by the lidar 2 and accuracy of the estimated position based on the NDT matching.

It is noted that, if there are multiple voxels suitable for estimating the own vehicle position, the autonomous driving control unit 18 may select the nearest voxel to the estimated own vehicle position as the reference voxel Btag. In another example, the autonomous driving control unit 18 may select as the reference voxel Btag the voxel corresponding to the highest index value of the reliability calculated based on the first weight value and the second weight value indicated by its reliability information.

In contrast, when the autonomous driving control unit 18 determines that there is no voxel suitable for estimating the own vehicle position (step S103; No), the autonomous driving control unit 18 terminates the process of the flowchart.

Next, with reference to FIG. 8, a description will be given a specific example based on the process according to the flowchart in FIG. 7.

Figure 8:
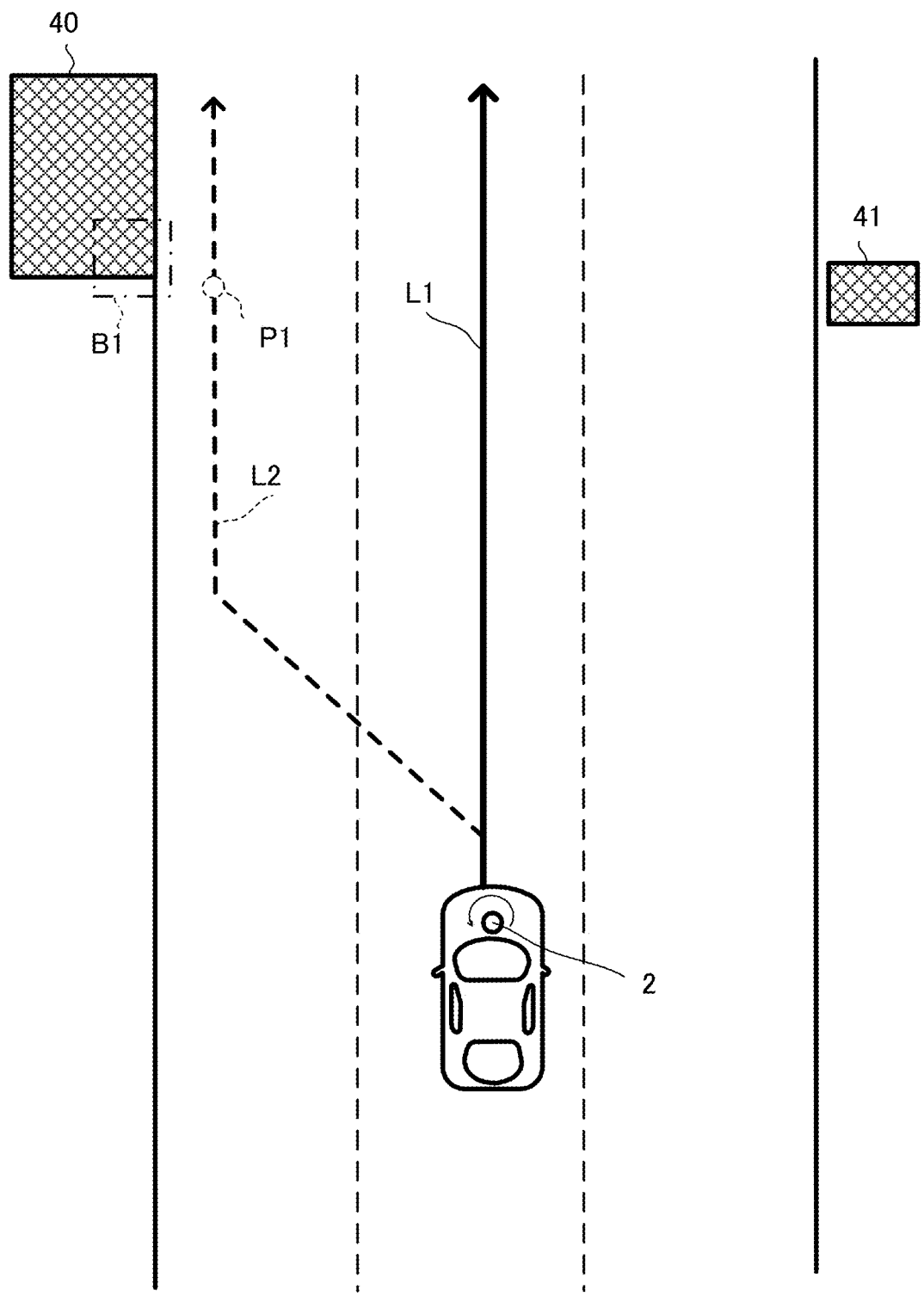
FIG. 8 is a plane view of the vehicle on a road with three lanes each way in cases where there is a feature on the left front side and where there is a feature on the right front side.

FIG. 8 is a plane view of the vehicle on a road with three lanes each way in cases where there is a feature 40 on the left front side and where there is a feature 41 on the right front side. In FIG. 8, the solid arrow "L1" indicates the target track before the execution of the flowchart in FIG. 7 and the dashed arrow "L2" indicates the target track after the execution of the flowchart in FIG. 7.

In the case of the example illustrated in FIG. 8, after the autonomous driving control unit 18 determines that the accuracy of the estimated position has decreased (see step S101), the autonomous driving control unit 18 acquires the reliability information of the voxel data corresponding to voxels in the vicinity of the route which includes voxels overlapping with the feature 41 and the feature 42 (see step S102). Then, with reference to the reliability information of the acquired voxel data, the autonomous driving control unit 18 determines that the voxel B1 which includes a part of the feature 40 is suitable for estimating the own vehicle position (see step S103). Thus, the autonomous driving control unit 18 considers the voxel B1 as the reference voxel Btag and specifies a position "P1" at which the voxel B1 is suitably measured. In this case, the position P1 is the nearest position to the voxel B1 among positions on the road at which the voxel B1 can be measured by the lidar 2. Then, the autonomous driving control unit 18 shifts the target track indicated by the solid line L1 to the track passing the position P1 indicated by the dashed line L2.

As just described, the autonomous driving control unit 18 moves the vehicle to the nearest lane to the reference voxel Btag or changes the travelling positions of the vehicle within the travelling lane to approach the reference voxel Btag. Thereby, the autonomous driving control unit 18 can accurately measure, at close range by the lidar 2, the reference voxel Btag corresponding to the voxel data having a high degree of reliability, thereby suitably increasing the accuracy of estimated own vehicle position.

As described above, when determining that the accuracy of the estimated position has decreased, the onboard device 1 according to the embodiment acquires, from map DB 10 including voxel data, reliability information included in the voxel data corresponding to voxels around the route. Then, on the basis of the acquired reliability information, the onboard device 1 sets a voxel suitable for estimating the own vehicle position as the reference voxel Btag. Then, the onboard device 1 output, to an electronic control device of the vehicle, control information for correcting the target track of the vehicle so as for the vehicle to pass the position suitable for measuring the reference voxel Btag. Thereby, the onboard device 1 can suitably control the driving of the vehicle to increase the accuracy of the estimated position.

MODIFICATIONS

Modifications suitable for the above embodiment will be described below. The following modifications may be applied to the embodiments in combination.

First Modification

Instead of the onboard device 1 storing the map DB 10 on the storage unit 12, a server device not shown may include the map DB 10. In this case, the onboard device 1 acquires necessary voxel data by communicating with the server device through a communication unit not shown.

Second Modification

In the voxel data included in the map DB 10, the first weight value and the second weight value are recorded as the reliability information. Instead, either one of the first weight value or the second weight value may be recorded as the reliability information in the voxel data.

In this case, on the basis of either one of the first weight value or the second weight value, the onboard device 1 calculates the evaluation function $E_k$ and determines the reference voxel Btag. Even in this mode, as with the above embodiment, the onboard device 1 can increase the degree of the matching regarding voxels with a high degree of reliability. Besides, the onboard device 1 can select a voxel with a high degree of reliability as the reference voxel Stag thereby to perform a vehicle control for increasing the accuracy of the estimated own vehicle position.

Third Modification

The configuration of the driving support system illustrated in FIG. 1 is an example, and the configuration of the driving support system to which the present invention can be applied is not limited to such a configuration illustrated in FIG. 1. For example, instead of including the onboard device 1, the driving support system may let an electronic control device execute the processes to be executed by the own vehicle position estimation unit 17 and autonomous driving control unit 18 of the onboard device 1. In this case, for example, the map DB 10 is stored on the storage unit in the vehicle and the electronic control device of the vehicle may receive the update information regarding the map DB 10 from a server device not shown.

Fourth Modification

The data structure of the voxel data is not limited to such a data structure including the mean vector and the covariance matrix as illustrated in FIG. 3. For example, the voxel data may include point cloud data, which is measured by the map maintenance vehicle and which is used for calculation of the mean vector and the covariance matrix, as it is. In this case, the point cloud data included in the voxel data is an example of the "position information of an object". Furthermore, instead of the NDT scan matching, any other scan matching method such as ICP (Iterative Closest Point) may be applied. Even in this case, as with the embodiment, by using the first weight value and the second weight value, the onboard device 1 puts weights on the evaluation function for evaluating the degree of the matching in each voxel. Thereby, it is possible to suitably increase the accuracy of the estimated position. If the accuracy of the estimated position has decreased, as with the embodiment, the onboard device 1 determines the reference voxel Btag based on the first weight value and the second weight value corresponding to voxels in the vicinity of the route and controls the vehicle based on the reference voxel Btag. Thereby, it is possible to suitably increase the accuracy of the estimated position.

BRIEF DESCRIPTION OF REFERENCE NUMBERS

1 Onboard device
10 Map DB
11 Interface
12 Storage unit
14 Input unit
15 Control unit
16 Information output unit

The invention claimed is:

1. An output device comprising:
   a memory configured to store one or more programs; and
   a processor coupled to the memory and configured to execute the one or more programs to:
      acquire accuracy information regarding position information of an object, the accuracy information being attached to voxel data in which the position information is recorded per voxel;
      modify a target track of a moving body to approach a voxel, the voxel being determined on a basis of the acquired accuracy information;
      estimate a position of the moving body by matching an output by a measurement unit with the position information included in map information, the measurement unit measuring a position of an object situated in surroundings of the moving body; and
      modify the target track of the moving body so that a position corresponding to a reference voxel is within a measurement range to be measured by the measurement unit, the voxel being determined on a basis of the acquired accuracy information.

2. The output device according to claim 1, wherein the processor is further configured to execute the one or more programs to estimate the position of the moving body by matching an output of a position sensor to the position information included in the voxel data, the position sensor measuring the position of the object situated in surroundings of the moving body.

3. The output device according to claim 2, wherein the voxel data includes position information with respect to each of regions into which space is regularly divided, and
   wherein the processor is further configured to execute the one or more programs to weight, on a basis of the accuracy information, an evaluation value which evaluates a degree of matching with respect to each of the regions.

4. The output device according to claim 1, wherein the voxel data includes position information with respect to each of regions into which space is regularly divided, and
   wherein the processor is further configured to execute the one or more programs to output control information for moving the moving body to a position at which a region determined based on the accuracy information is measured by a position sensor which measures the position of the object situated in surroundings of the moving body.

5. The output device according to claim 4, wherein the processor is further configured to execute the one or more programs to output the control information for:
   moving the moving body onto a lane nearest to the region determined by the accuracy information, or
   moving the moving body to approach the region determined by the accuracy information within a lane where the moving body is travelling.

6. The output device according to any one of claims claim 1, wherein the accuracy information is determined based on a distance from a measurement vehicle to a target object of measurement and an accuracy of position estimation by the measurement vehicle, the measurement vehicle performing a measurement for generating the position information.

7. The output device according to claim 1, wherein weight information regarding possibility of an occlusion is attached to the voxel data, and
   wherein the processor is further configured to execute the one or more programs to output, on a basis of the accuracy information and the weight information, control information for controlling the moving body.

8. The output device according to claim 7, wherein the processor is further configured to execute the one or more programs to estimate the position of the moving body by matching an output outputted by a position sensor to the position information included in the voxel data, the position sensor measuring the position of the object situated in surroundings of the moving body, wherein the voxel data includes position information with respect to each of regions into which space is regularly divided, and wherein the processor is further configured to execute the one or more programs to weight, on a basis of the accuracy information and the weight information, an evaluation value which evaluates a degree of matching with respect to each of the regions.

9. The output device according to claim 7, wherein the weight information is determined based on a height indicated by the position information.

10. A control method executed by an output device comprising:

acquiring accuracy information regarding position information of an object, the accuracy information being attached to voxel data in which the position information is recorded per voxel;

modifying a target track of a moving body to approach a voxel, the voxel being determined on a basis of the acquired accuracy information;

estimating a position of the moving body by matching an output by a measurement unit with the position information included in map information, the measurement unit measuring a position of an object situated in surroundings of the moving body; and modifying the target track of the moving body so that a position corresponding to a reference voxel is within a measurement range to be measured by the measurement unit, the voxel being determined on a basis of the acquired accuracy information.

11. A non-transitory computer readable medium including instructions executed by a computer, the instructions comprising:

acquiring accuracy information regarding position information of an object, the accuracy information being attached to voxel data in which the position information is recorded per voxel;

modifying a target track of a moving body to approach a voxel, the voxel being determined on a basis of the acquired accuracy information;

estimating a position of the moving body by matching an output by a measurement unit with the position information included in map information, the measurement unit measuring a position of an object situated in surroundings of the moving body; and modifying the target track of the moving body so that a position corresponding to a reference voxel is within a measurement range to be measured by the measurement unit, the voxel being determined on a basis of the acquired accuracy information.

\* \* \* \* \*